United States Patent [19]

Schulze et al.

[11] Patent Number: 4,765,430
[45] Date of Patent: Aug. 23, 1988

[54] METHOD AND ARRANGEMENT FOR PROPULSION REGULATION OF AN AUTOMOBILE

[75] Inventors: Bernd-Guido Schulze; Ernst Lissel, both of Wolfsburg, Fed. Rep. of Germany

[73] Assignee: Volkswagen AG, Wolfsburg, Fed. Rep. of Germany

[21] Appl. No.: 922,047

[22] Filed: Oct. 22, 1986

[30] Foreign Application Priority Data

Oct. 24, 1985 [DE] Fed. Rep. of Germany ....... 3537827

[51] Int. Cl.$^4$ .............................................. B60T 8/58
[52] U.S. Cl. ................................... 180/197; 303/97; 364/426
[58] Field of Search ............... 180/197, 247; 303/93, 303/95, 96, 97, 98, 99, 110, 111; 364/426

[56] References Cited

U.S. PATENT DOCUMENTS

| | | | |
|---|---|---|---|
| 4,164,872 | 8/1979 | Weigl | 180/197 X |
| 4,432,430 | 2/1984 | Lind et al. | 180/197 |
| 4,484,280 | 11/1984 | Brugger et al. | 364/426 |
| 4,615,410 | 10/1986 | Hosaka | 180/197 |
| 4,625,824 | 12/1986 | Lieber | 180/197 |
| 4,626,040 | 12/1986 | Ogino | 303/96 |

FOREIGN PATENT DOCUMENTS

3205627 12/1981 Fed. Rep. of Germany.
3331297 8/1982 Fed. Rep. of Germany.
3127302 9/1983 Fed. Rep. of Germany.

Primary Examiner—John J. Love
Assistant Examiner—Charles R. Watts
Attorney, Agent, or Firm—Brumbaugh, Graves, Donohue & Raymond

[57] ABSTRACT

The invention concerns a method for propulsion regulation of an automobile in the sense of prevention of undesirable spinning of the driven vehicle wheels whereby, as needed, only one of the wheel brakes is activated or the engine torque is reduced. Thereby is determined in the manner of an adaptive regulation in constant repetition from measured rotational speeds and stored vehicle and engine parameters for each driven wheel according to the relation $M_{ü}=\theta^{*}\cdot\Delta\dot{\omega}$, the excess moment causing the spinning of the wheel concerned and subsequently for each of the driven wheels in accordance with the relation $M_{red}=M_{ü}+k(\Delta\omega-s)$ the reduction moment required to eliminate the spinning/tendency to spin, which reduction moment is caused to be applied, depending on each driving situation, either in form of a brake torque in the correct magnitude and/or in form of a reduction of the engine torque in the correct magnitude.

1 Claim, 6 Drawing Sheets

METHOD AND ARRANGEMENT FOR PROPULSION REGULATION OF AN AUTOMOBILE

BACKGROUND OF THE INVENTION

The invention concerns a method for propulsion regulation of an automobile and more particularly a method for preventing spinning of the driven wheels, as well as an arrangement for execution of the method.

In view of the fact that in recent years considerable and successful efforts have been made to create devices which prevent the locking of vehicle wheels on braking (anti-locking systems, automatic locking prevention), it has become increasingly desirable on propulsion of the vehicle, to cause to act on the vehicle wheels only propulsion moments of such a magnitude that the adherence between the wheel and the roadway is not lost if at all possible, i.e., that the wheels do not spin, in that spinning of the wheel causes either a loss of traction (acceleration) or loss of driving stability, depending on the circumstances.

Contrary to systems for regulation of brake slip-page which as special accessories in passenger cars and in small series have been found to be useful in practice, arrangements for propulsion regulation, i.e., for regulation of propulsion slippage, are essentially still in their experimental or pilot stage.

In accordance with known devices for propulsion regulation of automobiles (e.g., as per DEP No. 3,127,302; DE-OS No. 3,205,627 and DE-OS No. 3,331,297) rotational speed sensors detect the rotational speed of the driven as well as the non-driven wheels and the slip of the driven wheels is determined on the basis of the ratio between the rotational speed of the driven and the non-driven wheels by means of digital or analog electronic circuit units. These slip values are compared with preset maximum slip values, i.e., limit or threshold values. If the limit or threshold values are exceeded, control signals are generated which, depending on whether the slip exceeds the preset limit or threshold value of only one or both driven wheels of an axle, cause the braking of only one driven wheel or the braking of both driven wheels or also only or simultaneously a reduction of the engine torque, e.g., through reduction of the fuel delivery.

Methods are also known (e.g., from DEP No. 3,127,302, DE-OS No. 3,331,297) for determining, with the help of differential stages and on the basis of the detected rotational speed, the angular acceleration of the driven wheels and comparing the same with preset limit or threshold values. As soon as the angular acceleration of the driven wheels exceeds the threshold value, the (acceleration) control signal is generated which in conjunction with the aforementioned (slip) control signal is utilized to influence the control of the engine as well as of the brakes of the driven wheels.

The known arrangements operate in a manner such that values determined on the basis of rotational speeds are compared with threshold values and an exceeding of such threshold values results in that the brake pressure of the wheel brakes associated with one or both spinning driven and driving wheels is built up in a preset manner and/or the fuel delivery or the ignition of the driving engine is modified, likewise in a preset manner, in each case until the spinning of the driven wheel or wheels is eliminated.

In case of these known arrangements we are dealing basically with a regulation in the manner of an antilocking system regulation algorithm with a reversed algebraic sign whereby when a defined angular acceleration or a defined slippage value is exceeded, the propulsion moment on the driving wheels is reduced until (through braking or reduction of fuel delivery) the propulsion slippage has safely become sufficiently small so that subsequently, the reduction can be eliminated until the angular acceleration or the slip value again exceeds the preset threshold value. It is true that this manner of regulation is suitable to constantly utilize the traction of the wheel in the vicinity of the optimal friction coefficient but it is by nature not free from oscillations and thus relatively uncomfortable.

The theoretically simplest regulation algorithm would consist in that the rotational speed of the driven wheels would attain a somewhat higher value than that of the non-driven wheels, whereby the difference between the two speeds would have to be chosen in such a manner that a sufficiently large propulsion slip would be ensured on the driving wheels. But in order to ensure non-oscillating control, such a regulation would necessitate extremely rapid control or correcting elements. Constructions of brake pressure control elements and servo throttle valves deemed suitable in this sense would necessitate an effort which would have to be deemed uneconomical, however.

SUMMARY OF THE INVENTION

Accordingly, it is an object of the invention to provide a method for preventing undesirable spinning of the driven wheels, which can be put into practice with an economically justifiable effort, as well as an arrangement for putting the method into practice. Another object of the arrangement is to ensure good traction and steering ability of the vehicle under all road conditions, on the one hand, and particularly non-oscillating operating, on the other hand, so as to offer considerable ease during driving.

Pursuant to these objects, and others which will become apparent hereafter, one aspect of the present invention resides in detecting the number of revolutions and the angular velocity of the wheels and the engine, determining an excess moment from the detected number of revolutions and stored vehicle parameters for each driven wheel according to the relation $M_{ü} = \theta^* \cdot \Delta\dot{\omega}$, $\theta^*$ being the effective mass moment of inertia of the driving train concerned and $\Delta\dot{\omega}$ being the difference in angular acceleration between the driven wheel concerned and a non-driven wheel, determining a reduction moment required for removal of spinning and a tendency to spin for each of the driven wheels in accordance with the relation $M_{red} = M_{ü} + k(\Delta\omega - s)$, k being a constant, $\Delta\omega$ being the difference in rotational speed between the driven wheel concerned and a non-driven wheel at an instant when reducing begins, and s being a predefined desired rotational speed difference between the wheels, determining if the speed of travel is smaller than a preset speed of travel, and if so there is applied, if a reduction moment is determined for only one of the driven wheels of an axle, to the wheel a braking moment corresponding to the reduction moment, and if a reduction moment has been determined for both wheels of the axle there is applied to the wheel associated with the larger reduction moment a braking moment corresponding to the difference between the two braking moments, and the control of the carburetion or fuel injection unit is modified so that the engine torque is reduced by a value corresponding to double the value of the smaller reduction moment and, finally, determining if the speed of travel is larger than the preset speed of travel, and if so modifying the control of the carburation or fuel injection unit so that the engine torque is reduced by a value corresponding to the sum of the reduction moments determined.

In accordance with the invention, there is thus determined in a fixed operating cycle in the manner of an adaptive regulation, in constant repetition, for each wheel the excess moment causing the spinning of said wheel and subsequently for each driven wheel the correct magnitude of the reduction moment required to eliminate said spinning/tendency to spin, in form of the braking moment to be applied to the driven wheel or wheels and/or of the engine torque modification required, whereby use is made of the engine performance characteristics ($M_{mot} = f(\omega_{mot}, \alpha_{DK})$) stored in memories of a digital computer unit as also other stored fixed vehicle parameters.

In contrast to known arrangements according to which regulating actions are triggered only when preset threshold values for the acceleration or the wheel slip of the driven wheels are exceeded, even the smallest differences in angular acceleration of the driven and non-driven wheels are continuously detected in a fixed operating cycle and converted into regulating measures. Thus, we are dealing here with a very finely stepped and sensitive reduction of the propulsion torques at very small mechanical time constants and in spite of a non-continuous action control, a very-low-oscillation regulation becomes possible.

The invention will be explained in the following in detail with reference to an exemplifying embodiment.

DETAILED DESCRIPTION OF THE PREFERRED EMBODIMENT

Figure 1:
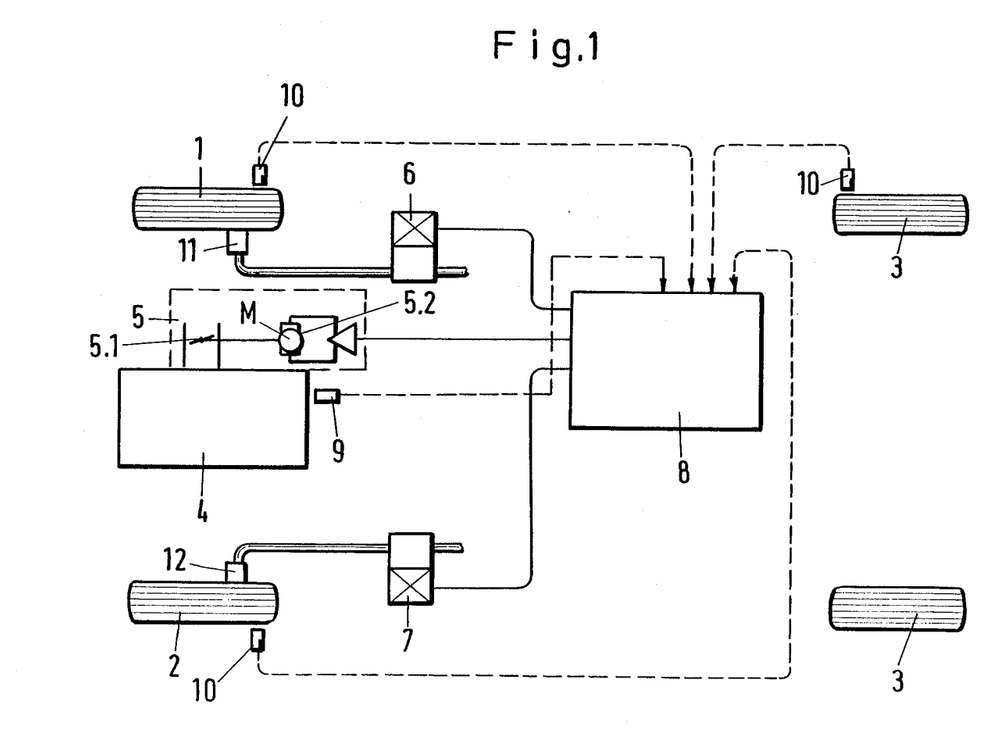
FIG. 1 is a schematic circuit of the propulsion regulation system in accordance with the invention.

In order to explain the invention, the chosen exemplifying embodiment provides for a passenger automobile with driven front wheels 1, 2 and non-driven rear wheels 3. However, the invention is not limited to vehicles with front wheel drive. Rather, it can be applied with the corresponding variations to vehicles with rear wheel drives and vehicles with all-wheel drives, too. Inasmuch as all-wheel driven vehicles do not have any non-driven wheels running slip-free, other known suitable measuring means, e.g., a rotating measuring wheel or the like, must be used as a substitute for the non-driven wheels to determine the true driving speed and, respectively, the slip of the driven wheels.

In order to detect the rotational speed and, respectively, the angular velocity of the two driven wheels 1, 2 and of one of the non-driven wheels 3 are provided speed sensors 10. In general, it will be sufficient to detect the speed of only one non-driven wheel. As a matter of principle, however, the speed of both non-driven wheels may of course be detected and the lower of the two speeds be utilized for propulsion regulation as representative of the true vehicle speed.

The detected speeds and, respectively, angular velocities $\omega_{VR}$, $\omega_{VL}$ and $\omega_H$ are delivered to a digital electronic circuit unit 8 as input signals. The unit 8 receives as a further input signal a signal proportional to the speed or angular velocity $\omega_{Mot}$ of the engine 4, which signal is detected by a sensor 9.

In the digital electronic circuit unit 8 which operates in a fixed cycle the $\omega$-signals delivered are processed and evaluated and control signals are produced by means of which are influenced control means for the fuel delivery to the engine 4 and/or for the wheel brakes 11, 12 associated with the driven wheels 1, 2.

For the control and regulation of fuel delivery to the engine 4 within the framework of propulsion regulation according to the invention, the carburetion or fuel injection unit 5 of the engine is equipped with a servo throttle valve (E-gas) 5.1 which is driven by an electric motor operator 5.2 and is designed, e.g., in such a manner that it can move through the entire needed adjustment range in approximately 50 ms while having high setting precision.

In order to facilitate, according to propulsion regulation as per the invention, control of the brake pressure delivered to the wheel brakes 11, 12, there are arranged in each of the brake lines leading from the said wheel brakes to the main brake cylinder, not shown, active brake pressure control means 6, 7 which are capable of acting on the wheel brakes 11, 12 associated with them with brake pressures which are proportional to the control signals delivered to them by the digital electronic circuit unit 8. The active brake pressure control means may be designed, e.g., in such a manner that upon their activation, the existing direct connection from the main brake cylinder to the wheel brake cylinder is closed off and at the same time, a corresponding pressure is built up in the part of the brake line leading to the wheel brake cylinder. This may be obtained, e.g., with the help of an electromagnetically operated piston unit as well as a ball valve which are each arranged in the region of the connections of the main brake cylinder leading to the wheel brakes of the driven wheels, in such a manner that the ball valve which normally permits free passage from the main brake cylinder to the wheel brake closes off whenever the propulsion regulation becomes effective, such that each of the outlets leading to the wheel brakes is connected with a hydraulic operating chamber acted on by the electromagnetically driven pistons, so that an axial piston displacement results in a corresponding brake pressure increase in the connected wheel brake.

As a matter of principle, however, all known control means generating a brake pressure proportional to their input signal are suitable to act as brake pressure control means.

Figure 2:
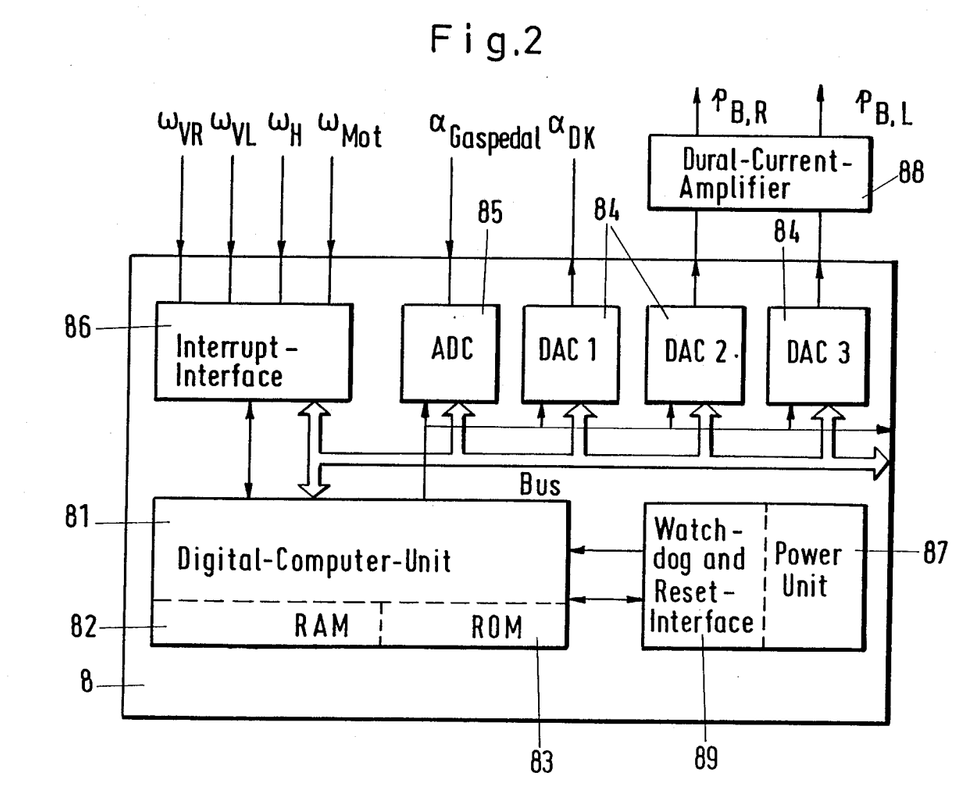
FIG. 2 is a circuit diagram of the digital electronic circuit unit of the system of FIG. 1.

The core of the propulsion regulation according to the invention is the digital electronic circuit unit 8 whose circuit structure appears schematically in FIG. 2.

It contains a digital computer unit 81, preferably a microprocessor, with a RAM memory 82 and a ROM memory 83. The microprocessor takes care of all data acquisitions, regulation and control. Suitable for this purpose is, e.g., the one-chip processor 8051 of the firm of Intel. This 8-bit processor has the following characteristics:

- 4K bytes ROM, 128 bytes RAM
- 2 interrupt-capable 16-bit timer/counters
- 2 external interrupt inputs
- 32 i/o lines (memory mapped)
- byte and bit CPU with multiplication and division
- 1 μs cycle time
- 5 v operating voltage.

As system inputs of the digital electronic circuit unit 8 serve the four rotational speed and, respectively, peripheral velocity signals $\omega_{VR}$, $\omega_{VL}$, $\omega_H$, $\omega_{Mot}$ as well as an analog accelerator pedal signal $a\,gas\,pedal$ coming from the accelerator pedal, not shown. Each rotational speed signal is converted in a comparator into a digital signal which by way of an interrupt interface 84 triggers an interrupt on the processor. The accelerator pedal signal $a\,gas\,pedal$ is converted in an analog-digital converter 85 into digital signals. The converter operates according to the principle of successive approximation and interrupt-controlled delivers its data to the processor.

The processor generates the output data for the three system interventions provided, i.e., $p_{B,R}$ (brake pressure of the right wheel brake), $p_{B,L}$ (brake pressure of the left wheel brake) and $\Delta a_{DK}$ (throttle valve angle reduction).

The digital-analog conversion of the output data generated by the processor is achieved in three digital-analog converters 84 which, together with the analog-digital converter 85, are joined with the processor bus, not marked by any reference number. The data transfer into the so-called latches (bistable memories) of the digital-analog converters is obtained by way of control lines, also not indicated by any reference number.

For the aforementioned output data of the three system interventions $P_{B,R}$, $P_{B,L}$ and $\Delta a_{DK}$, is provided one digital-analog converter each, whereby the two control signals influencing the wheel brakes 11 and 12—in the exemplifying embodiment—are amplified by means of a dual current amplifier 88.

In addition to the aforementioned peripheral circuits, such as rotational speed sensor and interrupt interface, analog-digital converter and digital-analog converters, the microprocessor also contains a power unit 87 for processing of the supply voltages. The power unit is further connected with a reset and watchdog circuit which on connection or faulty behavior of the microprocessor takes care of the proper restart. The processor bus and some of the control lines are led outside free for the purpose of diagnosis.

In the memory of the digital computer unit 81 are stored defined fixed data of the vehicle equipped with the propulsion regulation. Data stored include, for example, the braking characteristics of the two wheel brakes 11, 12, the vehicle mass m and the mass inertia moment $\theta$ of the rotating parts of the vehicle, thus in particular, as indicated among others in FIG. 3, the mass inertia moments of the wheels 1, 2, 3 and of the brakes 11, 12 connected therewith, of the driving half axles 16, 17, the axle drive (differential) 15, gear transmission 14, the clutch 13 and the engine 4, so that the mass inertia moments of the active driving train which are variously effective in the various gears are known.

Moreover, in the memories are also stored the engine and, respectively, throttle valve performance characteristics $M_{mot}=f(\omega_{mot}, a_{DK})$ which indicates the greatly non-linear relationship between the engine torque, the engine speed and throttle valve angle. It is obvious that in cases in which the control of the fuel delivery is not obtained by carburetors with throttle valves but by injection devices, the control of the injection device instead of the throttle valve angle will be utilized as a parameter.

A storage capacity of 16.16 bytes approximately is sufficient to store the engine and, respectively, throttle valve performance characteristics.

Into the digital computer unit 81 is thus incorporated the precise indication of the inertia moments of the rotating elements in the driving train of the vehicle as well as of the relationship between the braking moments $M_B$ of brakes 11, 12 and the brake pressures to be supplied therefor by the brake control means 6, 7 and the relationship between a throttle valve angle modification executed at a defined engine speed and the modification of the engine torque resulting therefrom.

Figure 5:
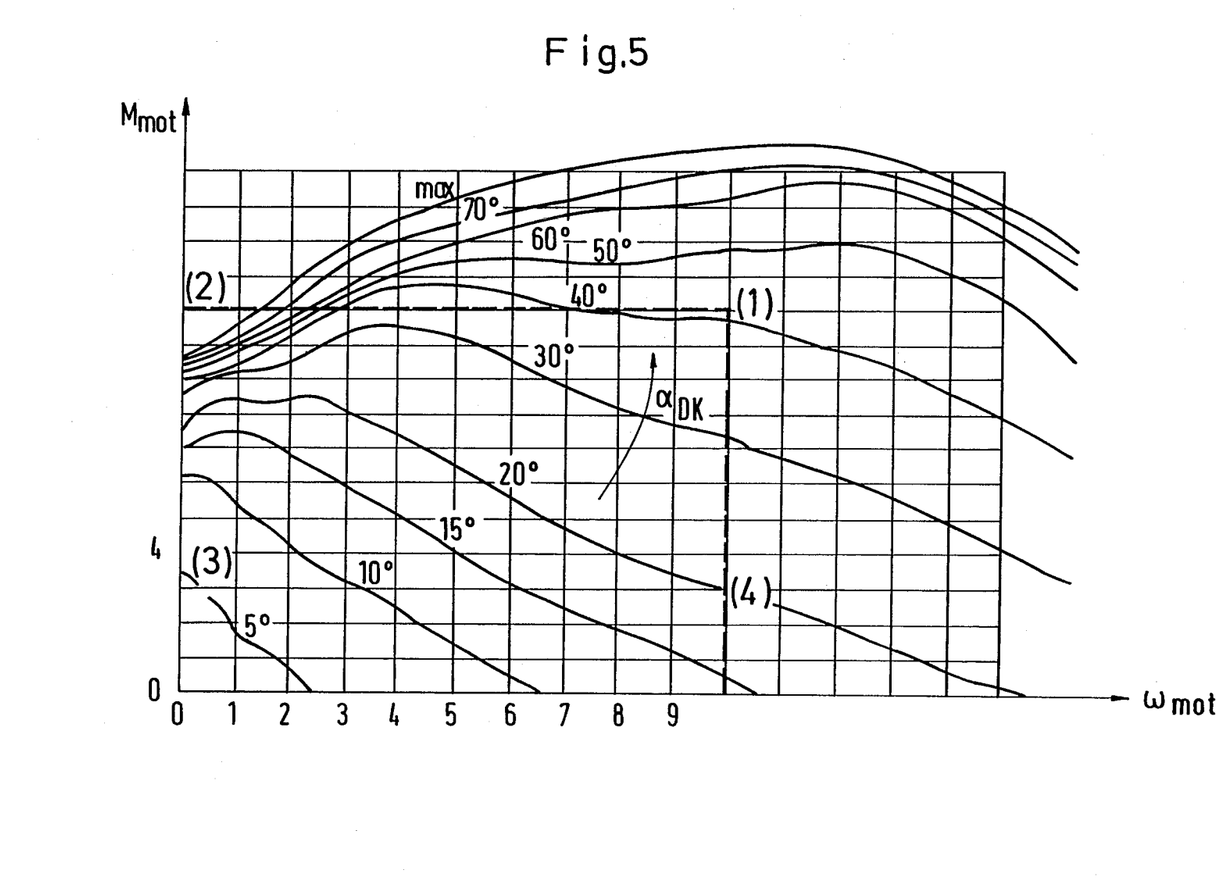
FIG. 5 is a series of curves showing the motor and, respectively, throttle valve performance characteristics of the engine for determination of the throttle valve angular modification required for torque reduction.

FIG. 5 illustrates an example of such an engine performance characteristics field $M_{mot}=f(\omega_{mot})$ with the throttle valve angle $a_{DK}$ as parameter.

The manner of operation of the propulsion regulation of the automobile in the sense of prevention of undesirable spinning of the driven vehicle wheels 1, 2 is as follows:

The angular velocities $\omega_{V,R}$, $\omega_{V,L}$, $\omega_H$ and $\omega_{mot}$ are detected in constant repetition in the manner of adaptive control, and from the values detected it is determined in connection with the aforementioned stored fixed vehicle data for each driven wheel whether an excess moment $M_{ü}$ effecting the spinning thereof is present, i.e., a driving moment which is larger than the maximum driving torque which can be transmitted to the road in consideration of the given road conditions (friction factor $\mu$).

Figure 3:
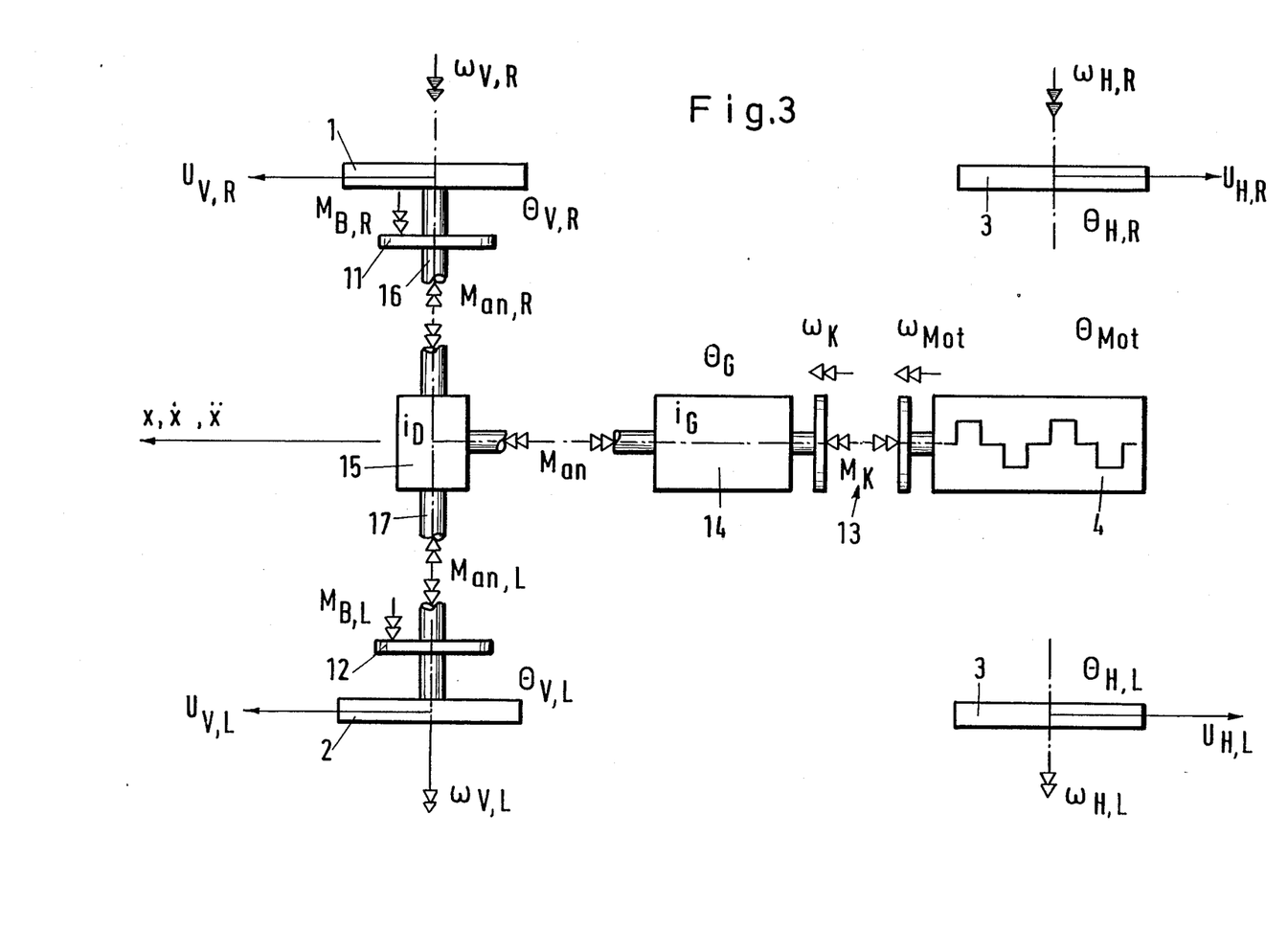
FIG. 3 is a diagram showing forces and moments effective in the propulsion train and the other rotating elements of the vehicle.

The excess moment can be calculated on the basis of the vehicle equations according to FIG. 3, i.e., $$U_{V,L}+U_{V,R}-U_{H,L}-U_{H,R}-m\cdot = 0 \qquad 1.$$

$$M_{an,L}-U_{V,L}\cdot r-M_{B,L}-\theta^*_{V,L}\cdot\dot\omega_{V,L}=0 \qquad 2.$$

$$M_{an,R}-U_{V,R}\cdot r-M_{B,R}-\theta^*_{V,R}\cdot\dot\omega_{V,R}=0 \qquad 3.$$

$$U_{H,L}\cdot r-\theta_{H,L}-\dot\omega_{H,L}=0 \qquad 4.$$

$$U_{H,R}\cdot r-\theta_{H,R}-\dot\omega_{H,R}=0 \qquad 5.$$

and in consideration of a few smaller simplifying assumptions as per the relationship $$M_{ü}=\theta\cdot\Delta\dot\omega$$

In these equations and regression equations and in FIG. 3, U in each case represents the peripheral forces effective on the individual wheels, $M_B$ represents the brake torques acting by way of the wheel brakes 11, 12 on the driven wheels 1, 2, $M_{an}$ represents the driving torques supplied by the engine 4 and effective on the driven wheels 1, 2, $\theta$ represents the mass inertia moments of the non-driven rear wheels 3, $\theta^*$ the mass inertia moments effective for the driven wheels 1, 2 taking into account not only the direct mass inertia moment $\theta$ of the wheel proper but also each of the effective pro rata mass inertia moments deriving from the driving train coupled with each driven wheel, m is the vehicle mass, the vehicle acceleration, $\dot{\omega}$ the angular acceleration of the wheels and $\Delta\dot{\omega}$ the difference between the angular accelerations of the driven wheel and the non-driven wheel, namely, for one vehicle side each. The effective mass inertia moments $\theta^*$ thus contain, among others, the mass inertia moment of the gear transmission 14 and—insofar as connected by the clutch 13—of the engine 4, whereby the gear ratio $i_D$ of the axle drive (differential) 15 and the ratio $i_G$ of the gear transmission 14 are to be taken into account. The angular acceleration $\dot{\omega}$ as well as the difference $\Delta\dot{\omega}$ between the angular acceleration of the driven and the non-driven wheels is determined by the digital computer unit 81 from the signals delivered by the sensors 9, 10. The knowledge of the effective mass inertia moments $\theta^*$ needed to determine the excess moments $M_{\ddot{u}}$ effective on the two driven wheels 1, 2 is available to the digital computer unit in the form of values stored as individual data.

When the driving torques $M_{an}$ effective on the driven wheels 1, 2 are reduced by suitable control interventions until the determined excess moments $M_{\ddot{u}}$ disappear, the spinning of the wheels is eliminated.

Accordingly, following determination of the excess moments $M_{\ddot{u}}$ is determined for each of the driven wheels 1, 2 as per the relation $$M_{red} = M_{\ddot{u}} + k(\Delta\omega - s)$$

the reduction moment $M_{red}$ required to eliminate the spinning/tendency to spin.

In this relation, $k \cdot \Delta\omega$ takes into account that in the time interval between the determination of the excess moments $M_{\ddot{u}}$ and the becoming effective of the reduction measures (reduction of the effective driving torque) a certain speed difference $$\Delta\omega = \Delta\omega_0 + \int_0^t \Delta\dot{\omega}(t) dt$$

was created between the driven and the non-driven wheel. The factor $-k.s$ takes into account that a certain speed difference between the driven and the non-driven wheels must be preserved for reasons of traction.

By providing a brake torque $M_B$ in the amount of the reduction moment $M_{red}$ thus determined or by a corresponding reduction of the driving torque produced by the engine 4 and effective on the driven wheel are immediately created the conditions at which the previously spinning wheel will no longer spin.

Inasmuch as the digital computer unit 81 employed as regulator has precise knowledge of the controlled system, it incorporating, due to the vehicle and engine data stored in its memories 82 and 83, precise information on the relationship between the brake torque to be supplied for lowering the reduction moment $M_{red}$ determined and the magnitude of the brake pressure $p_B$ to be generated therefor by way of the active brake pressure control means 6, 7 and, respectively, the relationship between the modification of the engine torque to be undertaken for the reduction moment in question and the modification $\Delta\alpha_{DK}$ of the throttle valve angle required therefor, it becomes possible for the digital computer unit 81 to be supplied immediately with the precise quantity of the correcting variable required to eliminate the disturbance $M_{\ddot{u}}$ so that, even though regulation is not continuous, a regulation very low in oscillations is achieved.

Thus, in order to remove the excess moment $M_{\ddot{u}}$, there are acted on in a defined manner, as required, either the wheel brakes 11, 12 of the driven wheels 1, 2 by a precisely determined brake pressure $p_B$ and/or, in order to reduce the engine torque $M_{mot}$ delivered by the engine 4, the fuel delivery to the said engine is reduced by a precisely determined value.

The propulsion regulation according to the invention differentiates between two regulation ranges, namely, the range of "slow speed" and the range of "high speed." By slow speed are understood traveling speeds which are smaller than a predefined traveling speed $v_o$ of the order of approximately 40 km/h. By high speed are thus understood driving speeds which exceed the said predefined traveling speed $v_o$.

In the "slow speed" regulating range, the reduction moment $M_{red}$ determined by the digital computer unit 81 is applied either by brake pressure build-up by means of the brake pressure control means 6, 7 or by reduction of the throttle valve angle by means of the electric motor operator 5.2, namely, in such a manner that if a reduction moment has been determined for only one of the driven wheels 1, 2, a brake torque $M_B$ corresponding to the said reduction moment is applied to the wheel concerned by the brake pressure build-up. In such a case, no change in the control of engine 4 takes place. However, if a reduction moment $M_{red}$ has been determined for both driven wheels 1, 2, there is applied, on the one hand, to the wheel for which the larger reduction moment was determined a brake torque $M_B$ corresponding to the difference between the two reduction moments determined and, on the other hand, the control of the carburetion or fuel injection unit 5 is adjusted simultaneously by adjustment of the servo throttle valve 5.1 in such a manner that the engine torque delivered by the engine 4 is reduced by a value $\Delta M_{mot}$ which corresponds to double the value of the smaller determined reduction moment—relative to the engine shaft. This means that in cases in which both wheels spin in the same manner, i.e., reduction moments $M_{red}$ of equal magnitude have been determined for both wheels 1, 2, only the engine torque delivered by the engine 4 is reduced. Otherwise, it is only one of the two wheels which is braked.

By this measure is obtained within the slow speed range the best possible traction while the controllability of the vehicle is ensured.

The braking of one of the wheels results, on the one hand, in a slip limitation preventing the spinning of the driving wheel and, on the other hand, in a differential lock effect. This "electronically regulated differential lock" has the same effect as a mechanical differential lock, namely, that at different friction coefficients of the two driven wheels, the wheel operating with the higher frictional value $\mu$ can support itself via the differential—15—against the torque of the other wheel to which driven wheel while it travels at a lower frictional value, braking is applied additionally. In contrast to a mechanical differential lock, in front wheel-driven vehicles, the controllability of the vehicle is thereby always ensured.

Contrary to the foregoing, during the "high speed" regulating range, there is reduced immediately without braking, even if only one of the driven wheels spins, the engine torque supplied by the engine 4 through modification of the throttle valve angle $\alpha_{DK}$ to such an extent that the engine torque modification $\Delta M_{mot}$ corresponds to the reduction moment $M_{red}$, relative to the engine shaft. In case both driven wheels spin, the control of the carburetion or fuel injection unit 5 is modified in such a manner that the engine torque is reduced by a value corresponding to the sum of the reduction moments determined for both driven wheels. By utilizing such a regulation process, which may be described as a quasi "select-low" principle, optimal traction is given up in exchange, however, minimal yaw reactions of the vehicle are ensured. Minimum control and yaw reactions of a vehicle during high-speed driving, however, constitute a safety moment which should not be underestimated.

As mentioned above, in order to effect a reduction precise in its magnitude of the engine torque by reduction of the throttle valve angle $\alpha_{DK}$, the engine performance characteristic $M_{mot}=f(\omega_{mot}\alpha_{DK})$ which describes the highly non-linear relation between the engine torque and the throttle valve angle is stored in the memories of the digital computer unit. FIG. 5 which illustrates the stored engine performance characteristics depicts the basic search algorithm for retrieval of the reducing throttle valve angle $\Delta\alpha_{DK}$.

1. Due to the detection of the engine speed and—in this example of an embodiment—the accelerator pedal position $\alpha_{Gas\,pedal}$, the digital computer unit 81 has at its disposal the engine angular velocity $\omega_{mot}$ prevailing at this instant as also the throttle valve angle $\alpha_{DK1}$ commanded at that instant by means of the accelerator pedal. Accordingly, the engine control prevailing at said instant is described by the performance characteristics point (1).

2. From the performance characteristics point (1), the computer unit can deduce the associated commanded engine torque $M_{mot}$ corresponding to point (2).

3. From the engine torque thus determined is deducted the relevant reduction moment calculated for the engine shaft, whereby one arrives at point (3). Depending upon whether the regulation range "low speed" or "high speed" is present, either double the amount of the smaller reduction moment $M_{red}$ determined from the excess moments or the sum of both reduction moments is employed as reduction moment.

4. By means of the engine torque which can be deduced for the characteristic point (3) and of the engine angular velocity which can be deduced from the characteristic point (1), the digital computer unit arrives at the characteristic point (4) which indicates to which value is to be reduced the engine torque delivered by the engine 4—possibly at simultaneous braking of one of the driven wheels—in order to terminate the spinning of the driven wheels.

5. The throttle valve angle read out at the characteristic point (4)—in the example of an embodiment 20°—constitutes the throttle valve angle at which a spinning of the wheels no longer exists in that the propulsion torque effective on the wheel concerned has been reduced relative to the original propulsion torque effective there by a value whose magnitude corresponds to the excess moment determined. The control signal $\alpha_{DK}$ (FIG. 2) to be transmitted by the digital computer unit—81—to the servo throttle valve 5.1 and, respectively, the motor operator 5.2 thereof results from FIG. 5 as $\Delta\alpha_{DK}=\alpha_1-\alpha_4$. Thus, in the example of an embodiment, the throttle valve angle must be adjusted from 40° to 20°, i.e., by 20°.

In consideration of the danger of engine stalling in the starting range, i.e., in the lowest velocity range, it is of advantage if the excess moments, i.e., the excess engine power, is rendered at least partly ineffective by application of the brakes to either one or both wheels only and that the engine torque delivered not be reduced. Inasmuch as the maximum engine torque on the driven axle in general is larger than the maximum brake torque, the engine can then not stall as a matter of principle. However, as a result, a spinning of the driven wheels cannot always be prevented in this lowest speed range. Nevertheless, due to the individual treatment of the wheels, i.e., through the individual braking of the wheels, the aforementioned electronic differential lock effect is present. However, in the event that the engine speed, in spite of these limitations, should drop below a defined number of revolutions, e.g., the idling speed, all reduction measures, thus also application of the brakes, are suspended so that stalling of the engine is safely avoided. This additional measure is of advantage in particular in case of vehicles with manually shifted gear transmissions. In such a case, the operator of the vehicle, e.g., if starting occurs under difficult conditions, such as starting on an incline or starting with a large towed load, must adjust on the frictional starting clutch a defined clutch slip at a high torque to be transmitted until the secondary speed of the clutch which increases as the traveling speed increases attains the range of stable engine speeds. Ordinarily, however, the operator will clutch even before that instant and thereby displace the necessary slip of the clutch to the driving wheels. This spinning of the wheels accordingly is necessary to the operation of the vehicle. A reduced intervention into the engine control would entail the risk of a stalled engine.

These additional regulation measures can be taken into account in a simple manner in the regulating electronics of the digital computer unit.

The propulsion regulation in accordance with the invention constitutes a sequence of individually closed program blocks which are passed through serially whereby through return from the last program block to the first program block is created an endless loop. This process may be interrupted asynchronously, if necessary, by so-called interrupt programs, i.e., subordinated auxiliary programs.

Figure 4:
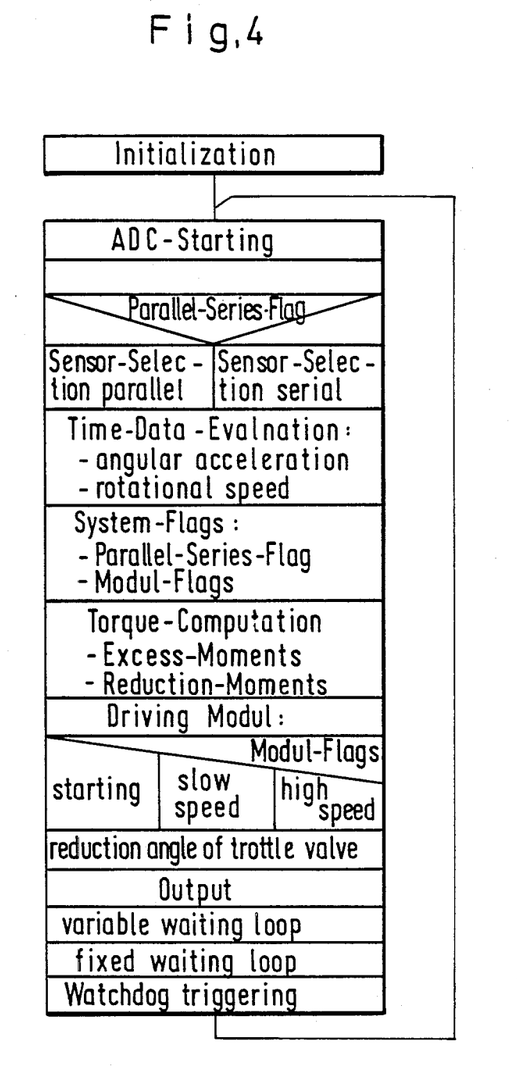
FIG. 4 is a structural diagram of the main program of the digital computer contained in the digital electronic circuit unit.

The course of regulation depicted schematically in FIG. 4 starts with the initialization. Here initial values are set after a precessor reset and control settings for the processor, i.e., the digital computer unit as well as its peripheral equipment are undertaken. Thereafter, the analog-digital converter (ADC) 85 is started, the converter then independently converts the analog accelerator pedal positions delivered to it into digital signals. Following completion of conversion, the analog-digital converter interrupts by means of an interrupt signal (interrupt program) the main program running at the time and the value converted by it is read into the RAM memory 82 of the processor.

The evaluation of the signals delivered by the sensors 9 and 10 occurs at the start of the program run. For this purpose, the evaluation is enabled and after evaluation occurs disabled again. For sensor signal evaluation counter 1 of the processor is started on initialization and it counts time pulses at a 1 MHz cycle. Its functioning is comparable to that of a clock. Each released sensor pulse thereby effects a jump in a sensor interrupt program which reads the clock and associates the count with the releasing sensor. Thereafter, the evaluation program in a loop waits for a second path pulse of the same sensor in order to read the count again. The difference in the counts is inversely proportional to the speed and, respectively, the angular velocity of the engine or the wheel associated with the sensor. Following time differential measurement of one channel, such channel is closed. In this manner, all four sensor channels are analyzed. At low speeds, the scoring occurs parallel, as it were, in other words, the reading of the counts of the four $\dot{\omega}$ channels are interlaced in time. Towards such end, each channel announces its interrupt readiness in that it sets its interrupt flip-flop. The flip-flop is reset when the interrupt has been worked off and thus is free for another channel.

At higher speeds, measurement of the four $\dot{\omega}$ channels is not anymore parallel but serial. The measuring times per channel are then small enough so that the measurement of all four channels may be considered quasi simultaneously.

In FIG. 4, this stage is indicated by the parallel-series flag block and, respectively, parallel sensor selection and serial sensor selection.

In the following time data evaluation program block is computed from the rough time measurement data the angular acceleration and the rotational speed of each wheel, and for the engine speed channel only the engine speed proper. Thereby the acceleration values result from the channel time difference between the momentary and the preceding program runs, taking into account the time interval between the two measurements.

In the system flags program block, the control flags are determined depending upon the condition of the vehicle, i.e., on the one hand, the flag for parallel and serial switching of the previously indicated time measurements and, on the other hand, the flags for determination of the applicable driving modules, i.e., the "starting", "slow speed" or "high speed" ranges explained above. The decision on whether the time data of the four channels are to be measured in parallel or serially may be rendered, e.g., a as function of the interrupt load (=sum of the wheel rotational speed) of the processor.

In the following torque computation program block are calculated firstly the excess moments $M_{\ddot{u}}$ for the two driven wheels 1, 2 according to the initially explained relationship $M_{\ddot{u}}=\theta^*\Delta\dot{\omega}$. Thereafter are calculated separately for each of the two driven wheels the reduction moment $M_{red}$ to be supplied and, respectively, the brake torque $M_B$. In order to make it possible to undertake the required torque reduction also via the throttle valve on the engine side, the brake torque of the wheels are recalculated for the engine shaft.

In the driving module program block the calculated torques or moments are associated in accordance with the module flags with the three output channels $\alpha_{DK}$, $p_{B,R}$ and $p_{B,L}$ of the digital computer unit 8. The brake torques $M_B$ are thereby converted into the corresponding brake pressures on the basis of the stored brake performance characteristics while the resulting reduction moment for an engine-side intervention is converted into a corresponding reduction angle of the throttle valve 5.1 by means of retrieval of the stored engine performance characteristics.

The output routine merely presents at the computer port the three output values $p_{B,R}$, $p_{B,L}$, $\Delta\alpha_{DK}$ made available in the preceding block in the RAM memory 82. Prior thereto, however, a check is performed as to whether the engine speed is above the maintenance speed of the engine. If this should not be the case, zero values are output and thus, a stalling of the engine by the propulsion regulation is avoided.

The program run is completed by the output of a trigger pulse for the watchdog in order to return to the start of the program.

Figure 6:
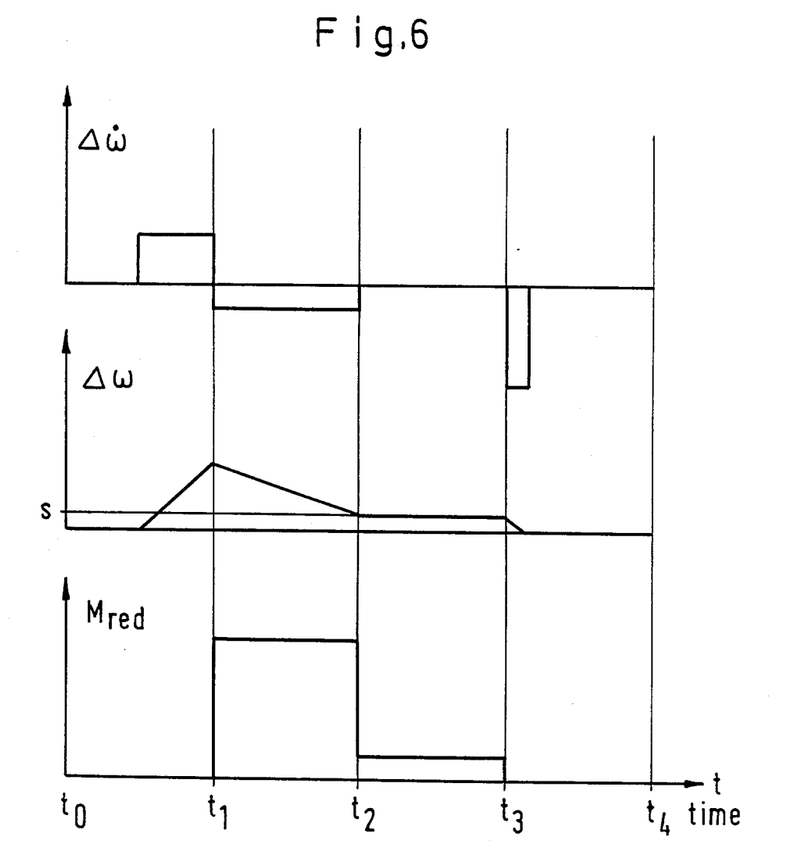
FIG. 6 is a series of wave forms depicting time of the propulsion regulation.

For purposes of clarification, FIG. 6 illustrates in highly simplified form a possible course in time of a regulating cycle of the propulsion regulation.

Let us assume that between the two instants $t_0$ and $t_1$ whose interval is determined by the preset operating cycle of the digital computer unit 8 a driven wheel suddenly loses its traction, e.g., as a result of an abrupt frictional coefficient change of the road from a high $\mu$ to a low $\mu$. As a result, there is immediately created on the wheel in question the differential angular acceleration $\Delta\dot{\omega}$ relative to the non-driven rear wheel 3 and, as a consequence in time thereof the differential speed $\Delta\omega$. The digital computer unit obtains knowledge of this condition at the instant $t_1$ inasmuch as due to the preset operating cycle, an inquiry occurs again only at the said instant. From $\Delta\omega$ and $\Delta\dot{\omega}$ the digital computer unit calculates the reducing moment $M_{red}$ which, depending on the module flag to be applied, is exerted in form of a brake moment or as engine torque modification, so that the spinning wheel is slowed down, which is manifested in a corresponding negative differential angular acceleration as well as a reducing differential speed. At the instant $t_2$ the digital computer unit is informed of the conditions then prevailing. In the example of an embodiment, it has been assumed that the differential speed precisely at this point has dropped to the value s, a speed difference which for reasons of traction is desirable. This differential speed is maintained according to the input relation $M_{red}=M_{\ddot{u}}+k(\Delta\omega-s)$ through control of $\Delta\dot{\omega}=0$. Thus, the reduction moment is not completely cancelled but only insofar as the differential speed s is maintained. At the instant $t_3$ it has been assumed that the driven wheel, due to a sudden jump of the coefficient of friction to a high $\mu$, undergoes a (negative) differential angular acceleration relative to the rear wheel. At this point, the reduction measure is immediately eliminated by the regulating algorithm.

While the invention has been illustrated and described as embodied in a method and arrangement for propulsion regulation of an automobile, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for propulsion regulation of an automobile having an engine, revolving driven and non-driven wheels, and wheel brakes associated with the driven wheels, so as to prevent undesirable spinning of the driven wheels, the method comprising the steps of: detecting the speed of the driven wheels and at least one non-driven wheel; detecting engine speed; generating control signals from the detected speed values by means of a digital electronic circuit unit operating with a fixed repetition frequency, said control signals selectively influencing the wheel brakes and a fuel-feeding unit which determines engine torque so as to selectively reduce the engine torque and activate, if necessary, only one wheel brake; and further comprising the following steps in constant repetition, detecting the speed of the wheels and the engine; determining from stored vehicle parameters and the detected speeds for each driven wheel an excess driving moment $M_{ü}$ responsible for undesired spinning of the driven wheel concerned according to the relation $M_{ü}=\theta^*\cdot\Delta\dot\omega$, wherein $\theta^*$ is the effective mass moment of inertia of a driving train concerned and $\Delta\dot\omega$ is a difference in angular acceleration between the driven wheel concerned and a non-driven wheel; determining the reduction moment required for preventing spinning and a tendency to spin for each of the driven wheels according to the relation $M_{red}=M_{ü}+k(\Delta\omega-s)$, wherein k is a constant, $\Delta\omega$ is the difference in rotational speed between the driven wheel concerned and the non-driven wheel at an instant when reduction of the speed of the driven wheel concerned becomes effective, and s is a predefined desired rotational speed difference between the wheels; and determining a speed of travel, and if said speed of travel is smaller than a preset speed of travel and if a reduction moment is determined for only one driven wheel of an axle, applying a braking moment to said one driven wheel corresponding to the reduction moment determined, and if said speed of travel is smaller than the preset speed of travel and if a reduction moment is determined for two driven wheels of the axle, on the one hand applying to the wheel to which the larger of both said reduction moments is determined a braking moment corresponding to the difference of the two reduction moments, and on the other hand modifying control of the fuel-feeding unit so that the engine torque is reduced by a valve corresponding to twice the value of the smaller of both said reduction moments, and if said speed of travel is larger than the preset speed of travel, modifying control of the fuel-feeding unit so that the engine torque is reduced by a value corresponding to the sum of both said reduction moments determined.

* * * * *